US012808416B2

(12) United States Patent
Lorenz

(10) Patent No.: US 12,808,416 B2
(45) Date of Patent: Nov. 24, 2026

(54) FIXED-CALIPER BRAKE COMPRISING ELECTROMECHANICAL-HYDRAULIC FORCE TRANSMISSION

(71) Applicant: Bayerische Motoren Werke Aktiengesellschaft, Munich (DE)

(72) Inventor: Tobias Lorenz, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 361 days.

(21) Appl. No.: 17/785,490

(22) PCT Filed: Dec. 8, 2020

(86) PCT No.: PCT/EP2020/085088
§ 371 (c)(1),
(2) Date: Jun. 15, 2022

(87) PCT Pub. No.: WO2021/122162
PCT Pub. Date: Jun. 24, 2021

(65) Prior Publication Data
US 2023/0025413 A1 Jan. 26, 2023

(30) Foreign Application Priority Data
Dec. 16, 2019 (DE) ..................... 10 2019 134 424.7

(51) Int. Cl.
*F16D 65/18* (2006.01)
*B60T 1/06* (2006.01)
(Continued)

(52) U.S. Cl.
CPC .............. *F16D 65/18* (2013.01); *B60T 1/065* (2013.01); *B60T 13/745* (2013.01);
(Continued)

(58) Field of Classification Search
CPC ...... F16F 65/18; F16F 55/228; F16F 2121/04; F16F 2121/28; F16F 2123/00;
(Continued)

(56) References Cited

U.S. PATENT DOCUMENTS 2,889,897 A * 6/1959 Sanford ................ F16D 65/853 188/71.6
3,396,824 A * 8/1968 Meier ...................... F16D 66/02 188/72.5
(Continued)

FOREIGN PATENT DOCUMENTS

CN 203161908 U 8/2013
CN 206265012 U 6/2017
(Continued)

OTHER PUBLICATIONS

International Search Report (PCT/ISA/210) issued in PCT Application No. PCT/EP2020/085088 dated Feb. 12, 2021 with English translation (six (6) pages).
(Continued)

*Primary Examiner* — Robert A. Siconolfi
*Assistant Examiner* — James K Hsiao
(74) *Attorney, Agent, or Firm* — Crowell & Moring LLP

(57) ABSTRACT

A fixed-caliper brake has a combined electromechanical/hydraulic force transmission, including a fixed caliper, a brake disc, a first brake piston device which is arranged on or in the brake caliper and is designed to directly or indirectly transmit a first pressure force to a first lateral face of the brake disc associated therewith by way of at least one brake piston, a second brake piston device which is arranged on or in the brake caliper and is designed to directly or indirectly transmit a second pressure force to a second lateral face of the brake disc associated therewith and opposite the first lateral face by way of at least one brake
(Continued)

piston, and an electromechanical actuator which is arranged on or in the brake caliper and is configured to exert a force onto the first brake piston device and onto the second brake piston device, respectively, when actuated. The force is further transmitted by the particular brake piston device, at least proportionally, as the first or second pressure force, respectively, onto the particular associated lateral face of the brake disc. The electromechanical actuator and the second brake piston device are hydraulically coupled to one another to cause the exertion of force from the electromechanical actuator to the second brake piston device.

12 Claims, 4 Drawing Sheets

(51) Int. Cl.

*B60T 13/74* (2006.01)
*F16D 55/228* (2006.01)
*F16D 121/04* (2012.01)
*F16D 121/28* (2012.01)
*F16D 123/00* (2012.01)
*F16D 125/06* (2012.01)
*F16D 125/34* (2012.01)

(52) U.S. Cl.

CPC ........ *F16D 55/228* (2013.01); *F16D 2121/04* (2013.01); *F16D 2121/28* (2013.01); *F16D 2123/00* (2013.01); *F16D 2125/06* (2013.01); *F16D 2125/34* (2013.01)

(58) Field of Classification Search

CPC ............... F16F 2125/06; F16F 2125/34; F16F 2121/14; F16F 2125/40; B60T 1/065; B60T 13/745

See application file for complete search history.

(56) References Cited

U.S. PATENT DOCUMENTS 3,435,922 A * 4/1969 Schmid .................. F16D 65/18 188/106 F
3,498,421 A * 3/1970 Ohmayer .............. F16D 55/224 188/106 F
3,828,894 A * 8/1974 Crossman ............... F16D 65/18 188/347
3,886,745 A * 6/1975 Kaida ....................... B60T 7/12 60/632
4,494,630 A * 1/1985 Stoka ...................... F16D 65/54 188/196 R
4,629,039 A * 12/1986 Imoto .................. B60T 8/4809 303/68
4,705,323 A * 11/1987 Imoto ..................... B60T 8/348 188/72.4
4,775,034 A * 10/1988 Pachner ................ F16D 55/227 188/73.39
4,799,575 A * 1/1989 Kroniger ............... F16D 55/228 188/71.6
4,867,280 A * 9/1989 Von Gruenberg ...... F16D 65/18 92/174
5,067,778 A * 11/1991 Testardi .................... B60T 8/00 303/119.2
5,209,154 A * 5/1993 Black .................... F16D 65/543 91/519
5,645,143 A * 7/1997 Mohr .................... B60T 8/4072 303/162
5,682,965 A * 11/1997 Prinzler .................. F16D 65/74 188/72.4
5,829,845 A * 11/1998 Maron .................. B60T 13/741 188/106 P
5,845,747 A * 12/1998 Rike ..................... F16D 55/228 188/264 G
6,073,733 A * 6/2000 Kapanowski ........... F16D 65/18 188/72.4
6,213,564 B1 * 4/2001 Face, Jr. ............ H10N 30/2048 303/3
6,230,851 B1 * 5/2001 Yoshizawa ............... B61H 5/00 188/72.3
6,293,632 B1 * 9/2001 Grote .................... B60T 13/741 303/122.08
6,367,597 B1 * 4/2002 De Vries ................ F16D 65/18 188/71.9
6,446,767 B1 * 9/2002 Gonzalez ................ F16D 65/14 188/71.6
6,502,673 B1 * 1/2003 Toriyama ................ F16D 65/18 188/72.4
6,837,342 B1 * 1/2005 Olschewski .......... F16D 55/228 188/72.8
7,086,504 B2 * 8/2006 Baumgartner .......... F16D 65/18 188/71.9
7,108,109 B1 * 9/2006 Wilkings ................ B22C 9/046 188/73.1
7,318,502 B2 * 1/2008 Costa .................... F16D 55/228 188/26
7,455,152 B2 * 11/2008 Wang .................... F16D 55/225 188/106 P
7,971,689 B2 * 7/2011 Moore .................... F16D 65/18 188/26
8,075,066 B2 * 12/2011 Greer .................... B60T 8/5093 303/157
9,205,825 B2 * 12/2015 Isono .................... B60T 13/588
9,440,633 B2 * 9/2016 Switzer ................ G01M 11/081
9,604,605 B2 * 3/2017 Shim ..................... B60T 13/686
9,758,141 B2 * 9/2017 Kim .......................... B60T 7/20
10,138,960 B2 * 11/2018 Yasui .................... F16D 55/226
10,436,269 B2 * 10/2019 Demorais ............. F16D 55/226
11,149,803 B1 * 10/2021 Morales ................ F16D 41/069
11,772,625 B2 * 10/2023 Lim ...................... F16D 65/183 188/72.8
2005/0211508 A1 * 9/2005 Roupp .................... F16D 55/00 188/73.46
2006/0267402 A1 * 11/2006 Leiter ................... B60T 13/741 303/20
2008/0029353 A1 * 2/2008 Ganzhorn ............... F16D 65/18 188/71.8
2008/0128222 A1 * 6/2008 Birkeneder ......... F16D 55/2255 188/71.7
2008/0277212 A1 11/2008 Johansson
2009/0294225 A1 * 12/2009 Skjaerbaek ............. F16D 65/18 188/72.8
2013/0048442 A1 * 2/2013 Burnett ............... F16D 55/2245 188/72.1
2013/0256068 A1 * 10/2013 Hazeki .................. F16D 55/226 188/72.4
2015/0096856 A1 * 4/2015 Isono ...................... F16D 51/62 188/70 R
2017/0066419 A1 * 3/2017 Baehrle-Miller ....... B60T 8/246
2017/0106222 A1 * 4/2017 Mayer ................ A63B 21/0051
2017/0343069 A1 * 11/2017 Yoshikawa ............. B60T 17/08
2018/0106319 A1 * 4/2018 Solari ................... B60T 17/221
2018/0264305 A1 * 9/2018 Buckrell .......... A63B 21/00065
2019/0256072 A1 * 8/2019 Hyeon .................... F16D 65/18
2019/0316644 A1 * 10/2019 Demorais ............... F16D 65/18
2020/0063811 A1 * 2/2020 Bahmata ............. F16D 65/0068
2022/0178414 A1 * 6/2022 Herzog ................. F16D 55/226
2022/0212644 A1 * 7/2022 Wang .................. F16D 55/2265
2022/0289161 A1 * 9/2022 Leiber ................... B60T 8/4036
2024/0326761 A1 * 10/2024 Putz ........................ B60T 8/172

FOREIGN PATENT DOCUMENTS

DE 3326823 A1 2/1985
DE 43 01 684 A1 8/1994
DE 699 22 421 T2 5/2005
DE 10 2006 049 534 A1 4/2008
DE 10 2011 117 437 A1 5/2011
DE 10 2013 200 217 A1 7/2013

(56) References Cited

FOREIGN PATENT DOCUMENTS

| | | | |
|---|---|---|---|
| GB | 1084410 | A | 9/1967 |
| JP | 60-136630 | A | 7/1985 |
| JP | 2008-207733 | A | 9/2008 |
| WO | WO 97/37878 | A1 | 10/1997 |

OTHER PUBLICATIONS

German-language Written Opinion (PCT/ISA/237) issued in PCT Application No. PCT/EP2020/085088 dated Feb. 12, 2021 (five (5) pages).

German-language Search Report issued in German Application No. 10 2019 134 424.7 dated Aug. 27, 2020 with partial English translation (12 pages).

Chinese-language Office Action issued in Chinese Application No. 202080081869.7 dated Apr. 15, 2023 with English Translation (18 pages).

* cited by examiner

FIXED-CALIPER BRAKE COMPRISING ELECTROMECHANICAL-HYDRAULIC FORCE TRANSMISSION

BACKGROUND AND SUMMARY

The present invention relates to a fixed-caliper brake, in particular for braking a vehicle wheel, in which a combined electromechanical/hydraulic transmission of force is used.

A plurality of different types of brakes are known in the field of disk brakes. These include in particular what is referred to as the fixed-caliper brake which is distinguished in that in it the brake caliper carrying the brake pistons is fixed fixedly, i.e. substantially immovably, to the wheel suspension. Therefore, in particular in contrast to the further type of brake of what is referred to as the sliding-caliper brake or floating-caliper brake, in which the brake caliper is connected movably to the wheel suspension, brake pistons are required on both sides of the brake disk, the brake pistons acting directly, or in particular via respective brake pads, indirectly on the brake disk by pressure force.

In conventional disk brakes, force is transmitted to the brake piston or the brake pistons typically hydraulically. A pressure generating device, for example a brake pedal or a brake booster coupled thereto, is used, during the braking operation, to pressurize a hydraulic fluid in a hydraulic channel running through the brake caliper such that the hydraulic fluid in turn exerts a pressure force on the brake pistons coupled to the hydraulic channel. This pressure force is transmitted via the brake pistons and a brake pad, optionally connected thereto, to the brake disk in order to brake the latter. A simplified operating principle of such a conventional disk brake is illustrated using the example of a hydraulic fixed-caliper brake in FIG. 1.

In addition, purely electromechanical types of brake are also known, especially for use as parking brakes, in which either the braking impulse, the transmission of the required energy or the actuation of the brake members (for example brake shoes) takes place electrically and without using a hydraulic circuit.

Within the context of the design of electromechanical brake systems, the features sought include a reduction of weight and size and improvement of the appearance of the brake caliper. However, if an electromechanical actuator is used instead of a hydraulic system for driving the brake piston(s), as a rule the configuration requirements of the entire brake caliper also change. In the case of a fixed-caliper brake, the problem arises of at least one electromechanical actuator for displacing the brake pistons having to be provided on both sides of the brake disks. This requires additional construction space (which is not always available) and increases the weight of the brake caliper. In comparison to other designs of brake calipers (for example sliding calipers, floating calipers), the fixed caliper also has aesthetic advantages.

The present invention is based on the object of providing a fixed-caliper brake which is improved even further.

This object is achieved according to the teaching of the independent claims. Various embodiments and developments of the invention are the subject matter of the dependent claims.

A first aspect of invention relates to a fixed-caliper brake, in particular for braking a vehicle wheel. It has: (i) a brake caliper; (ii) a brake disk; (iii) a first brake piston device which is arranged on or in the brake caliper and is configured to use at least one brake piston to directly or indirectly (in particular via at least one brake pad) to transmit a first pressure force to an associated first side surface of the brake disk; (iv) a second brake piston device which is arranged on or in the brake caliper and is configured to use at least one brake piston to directly or indirectly (in particular via at least one brake pad) to transmit a second pressure force to an associated second side surface of the brake disk opposite the first side surface; and (v) an electromechanical actuator which is arranged on or in the brake caliper and is configured, when actuated, to exert, both on the first brake piston device and on the second brake piston device, a respective force which is transmitted further by the respective brake piston device, at least proportionally as a respective first or second pressure force, to the respectively associated side surface of the brake disk. The actuator and the second brake piston device are coupled hydraulically to each other in order to bring about the exertion of force from the actuator on the second brake piston device.

The exertion of force mentioned from the actuator to the first brake piston device can take place directly or indirectly, while the exertion of force from the actuator on the second brake piston device takes place indirectly via the hydraulic coupling.

Within the context of the invention, an "electromechanical actuator" should be understood as meaning a drive device which converts an electric signal into mechanical movements or changes of physical variables, such as in particular pressure, and can therefore engage actively in a controlled process. In particular, electrically activated actuating members, such as, for example, spindle drives or worm drives, piezo electric converters and pumps, are in each case electromechanical actuators within the context of the invention. The actuator can be designed in particular as a constructional unit or assembly and therefore can be handleable and in particular exchangeable as a whole. The electric signal can in particular also be produced first in the actuator itself, for example by conversion of a received, optically or wirelessly transmitted control signal into a corresponding electric control signal.

Within the context of the invention, a "brake piston device" should be understood as meaning a device which has one or more brake pistons which are configured for direct or indirect (in particular via one or more associated brake pads) action of force on a brake disk. The brake piston device can be designed in particular as a constructional unit or assembly and can therefore be handleable and in particular exchangeable as a whole.

In the fixed-caliper brake according to the invention, a combination of an electromechanical drive and a hydraulic drive is therefore used for the brake piston devices. In particular in the case of a vehicle brake, it may be preferred for the outer brake piston device to be activated solely via a hydraulic coupling to the electromechanical actuator arranged in situ in the brake itself, on or in the brake caliper. In particular, one or more of the following advantages can thus be realized:

(a) Compared to a conventional hydraulic fixed-caliper brake according to the operative principle illustrated in FIG. 1, a signal-based activation, in particular an electrical activation of the fixed-caliper brake is made possible, and this can also be used in particular in conjunction with what are referred to as "brake-by-wire" applications.

(b) Compared to fixed-caliper brakes in which a respective actuator is provided on both sides of the brake disks for actuating the brake piston device arranged in each case on the corresponding side, the advantage arises that one of the two actuators can be dispensed with and therefore also the requirement for construction space on the corresponding side can be significantly reduced.

(c) Compared to the known sliding-caliper or floating-caliper brakes, in particular a saving on weight and a smaller requirement for construction space, in particular on the outer side of a vehicle brake in the radial direction toward the rim, can be realized. This possibility is based in particular on the fact that, in the case of sliding-caliper or floating-caliper brakes, the brake caliper housing (fist) typically has to be of relatively solid and therefore heavy design. In addition, because of the operating principle of the fixed-caliper in comparison to the floating-caliper brake in conjunction with the electromechanical-hydraulic drive according to the invention, advantages are afforded aesthetically which are beneficial in vehicles in particular whenever “open” rims are used for the vehicle wheels, permitting a direct view of the brake, in particular on the outer side thereof.

The following is a description of preferred embodiments of the fixed-caliper brake that can each be combined with one another as desired and with the further described other aspects of the invention, unless this sis expressly ruled out or is technically impossible.

According to some embodiments, the actuator is arranged relative to the brake disk on the same side of the fixed-caliper brake as the first brake piston device. In this way, in particular the structural form and especially the requirements for construction space for that part of the brake which is located on the side opposite this side, preferably this is the outer part thereof, can be optimized since an actuator is not required here and therefore no additional construction space is taken up for it. In particular, it is possible to integrate the actuator in the first brake piston device itself and therefore to achieve a further optimization of the construction space.

According to some embodiments, for the hydraulic coupling of the actuator to the second brake piston device, a hydraulic channel running at least in sections inside the brake caliper is provided. This also serves in turn for forming a fixed-caliper brake configuration which is optimized as far as possible in terms of construction space.

According to some embodiments, the first brake piston device is also hydraulically coupled to the actuator for bringing about the exertion of force from the actuator to the first brake piston device. In addition, a virtually simultaneous activation of both brake piston devices for optimizing the braking action and for avoiding excessive wear of the brake can thus be achieved in a simple manner.

For this purpose, in particular according to some embodiments, the actuator and the two brake piston devices can be hydraulically coupled to a common hydraulic channel in order to bring about the exertion of force from the actuator on the brake piston devices. A pressurization, brought about by the actuator, of the fluid in the fluid channel therefore acts uniformly and, at least substantially, simultaneously on the two brake piston devices.

According to some embodiments, instead or in addition, the first brake piston device is coupled in terms of force mechanically or electromechanically to the actuator, in order to bring about the exertion of force from the actuator on the first brake piston device, in such a manner that, during this exertion of force, at the same time the exertion of force from the actuator on the second brake piston device is brought about via the hydraulic coupling thereof to the actuator. This has in particular the advantage that the first pressure force takes place, at least substantially, independently of a potential malfunction of the hydraulic coupling used for activating the second brake piston device, which can contribute to increasing the operational reliability of the brake. In particular, the fixed-caliper brake can be configured here in such a manner that, within the scope of the coupling in terms of force, the exertion of the force on the first brake piston device takes place directly by the actuator itself. Furthermore, however, solutions are also possible in which the mechanical or electromechanical coupling of force takes place only indirectly, in particular via one or more intermediate elements or via one or more, in particular electric or magnetic fields, or a combination of at least two of the aforementioned possibilities. According to some of these embodiments, the actuator is designed for generating force by means of a spindle drive or a piezo element or a pump.

According to some embodiments, the first brake piston device has two pistons which are hydraulically coupled to each other in terms of force by means of a fluid located between them. It is thus possible, firstly, for an action of force on the brake disk by the first brake piston device and at the same time coupling in terms of force to the second brake piston device via the fluid to be achieved.

According to a first embodiment in this regard, the first brake piston device has a telescopic brake piston which has a hollow piston which is arranged movably relative to the brake disk and has an internal piston arranged therein so as to be movable relative to the hollow piston. The interior of the hollow piston together with the head surface of the internal piston defines a fluid chamber, which is hydraulically coupled to the second brake piston device, inside the hollow piston. The telescopic brake piston is coupled in terms of force to the actuator in such a manner that, when the actuator is actuated, a fluid located in the fluid chamber is pressurized via the internal piston, the pressurization firstly bringing about the first pressure force on the brake disk via the hollow piston and secondly bringing about the second pressure force on the brake disk via the hydraulically coupled second brake piston device. In this first embodiment, a particularly small structure form can be achieved because of the small amount of space required by the telescopic brake piston with the brake piston having the same stroke.

In an alternative second embodiment with regard thereto, the two pistons are connected in series, and the intermediate space between the two pistons defines a fluid chamber, which is hydraulically coupled to the second brake piston device, inside the first brake piston device for the fluid. A first of the two pistons is coupled in terms of force to the actuator in such a manner that, when the actuator is actuated, the fluid located in the fluid chamber is pressurized via this first piston, the pressurization firstly bringing about the first pressure force on the brake disk via the second of the pistons and secondly bringing about the second pressure force on the brake disk via the hydraulically coupled second brake piston device. In this embodiment, in particular a low degree of complexity of the fixed-caliper brake can be achieved. This can be realized in particular by the two pistons being arranged movably inside a single cylinder used jointly by them. They can be arranged in particular in such a manner that they are displaceable in a translatory manner coaxially inside the cylinder along the longitudinal direction thereof.

In some embodiments, the actuator is connected to an electric line which serves both for the energy supply of the actuator and for the activation thereof. This can also advantageously be used to further reduce the complexity and the construction space requirements for the fixed-caliper brake.

A second aspect of the invention relates to a vehicle, in particular to a motor vehicle, having a fixed-caliper brake according to the first aspect of the invention, in particular according to one or more of the aforementioned embodiments.

The features and advantages explained with regard to the first aspect of the invention also apply correspondingly to the second aspect of the invention.

Further advantages, features and application possibilities of the present invention emerge from the following detailed description in conjunction with the figures.

DETAILED DESCRIPTION OF THE DRAWINGS

The various fixed-caliper brakes explained below are each described, without this being understood as a limitation, using the example of a disk brake for a motor vehicle, since this is a particularly relevant application.

Figure 1:
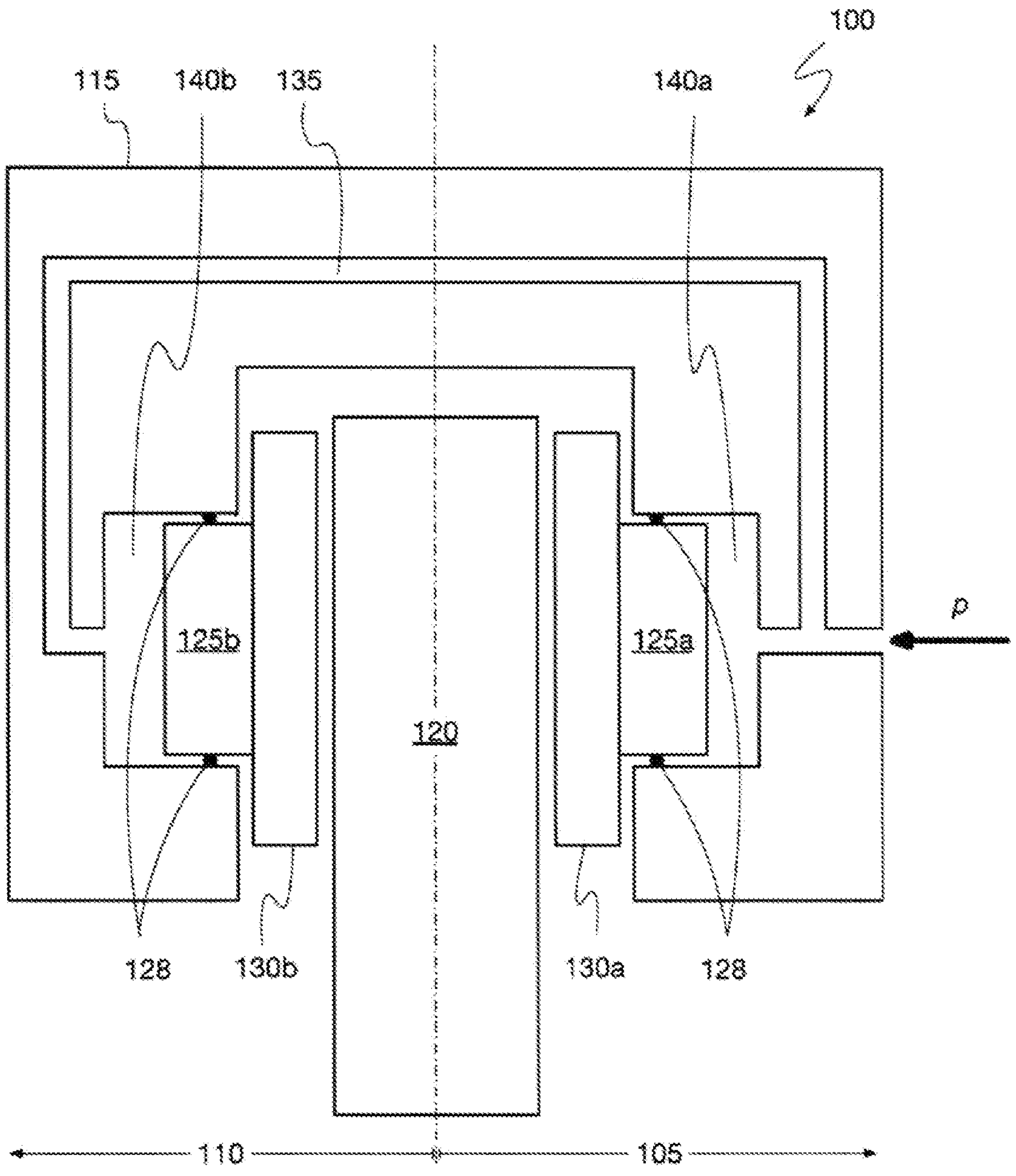
FIG. 1 PRIOR ART
FIG. 1 schematically shows a simplified operating principle of a conventional hydraulic fixed-caliper brake from the prior art.

The conventional hydraulic fixed-caliper brake illustrated in FIG. 1 has a brake caliper 115 connected fixedly to a wheel suspension of the wheel to be braked, a brake disk 120 and a respective brake piston device on both sides thereof, i.e. both on an inner side 105 and on an outer side 110 of the fixed-caliper brake 100. The brake piston device has a brake piston 125*a* and 125*b* and a brake pad 130*a* and 130*b* fastened thereto, wherein the respective brake piston 125*a* and 125*b* is arranged so as to be movable in a cylindrical cavity formed by the brake caliper 125 and sealed by means of one or more seals 128.

In order to actuate the brake, a suitable fluid, e.g. a hydraulic fluid, for example a hydraulic oil suitable for the operation of a fixed-caliper brake, is pressed via a hydraulic line under a pressure p into a hydraulic channel 135 formed in the brake caliper 115. The pressure p can be generated in a known manner in particular by a brake pedal or a brake booster connected in between. In addition, the hydraulic channel 135 is designed as a connection between the two cylindrical cavities in which the brake pistons 125*a* and 125*b* are arranged. In each of these cavities, the respective volume region not taken up by the associated brake piston 125*a* or 125*b* itself is a fluid chamber 140*a* or 140*b*. By subjecting the fluid to the pressure p, the pressure propagates through the fluid in the hydraulic channel 135 on both sides of the fixed-caliper brake 100 into the corresponding fluid chamber 140*a* and 140*b* and is transmitted there to the rear side of the respective brake piston 125*a* and 125*b*. The respective brake piston 125*a* and 125*b* is thereby caused to press the brake pad 130*a* and 130*b* attached to the front side thereof with a drive force corresponding, at least substantially, to the pressure p against the brake disk 120 in order to brake the latter and therefore an axle which is coupled thereto and has the vehicle wheel fastened thereto.

In this known type of fixed-caliper brake, a substantially symmetrical construction is therefore provided, in which the activation and the energy supply of the fixed-caliper brake 100 as a whole take place solely hydraulically and accordingly an exclusively hydraulically actuated brake piston is provided in each case on both sides 105 and 110 of the fixed-caliper brake 100.

Figure 2:
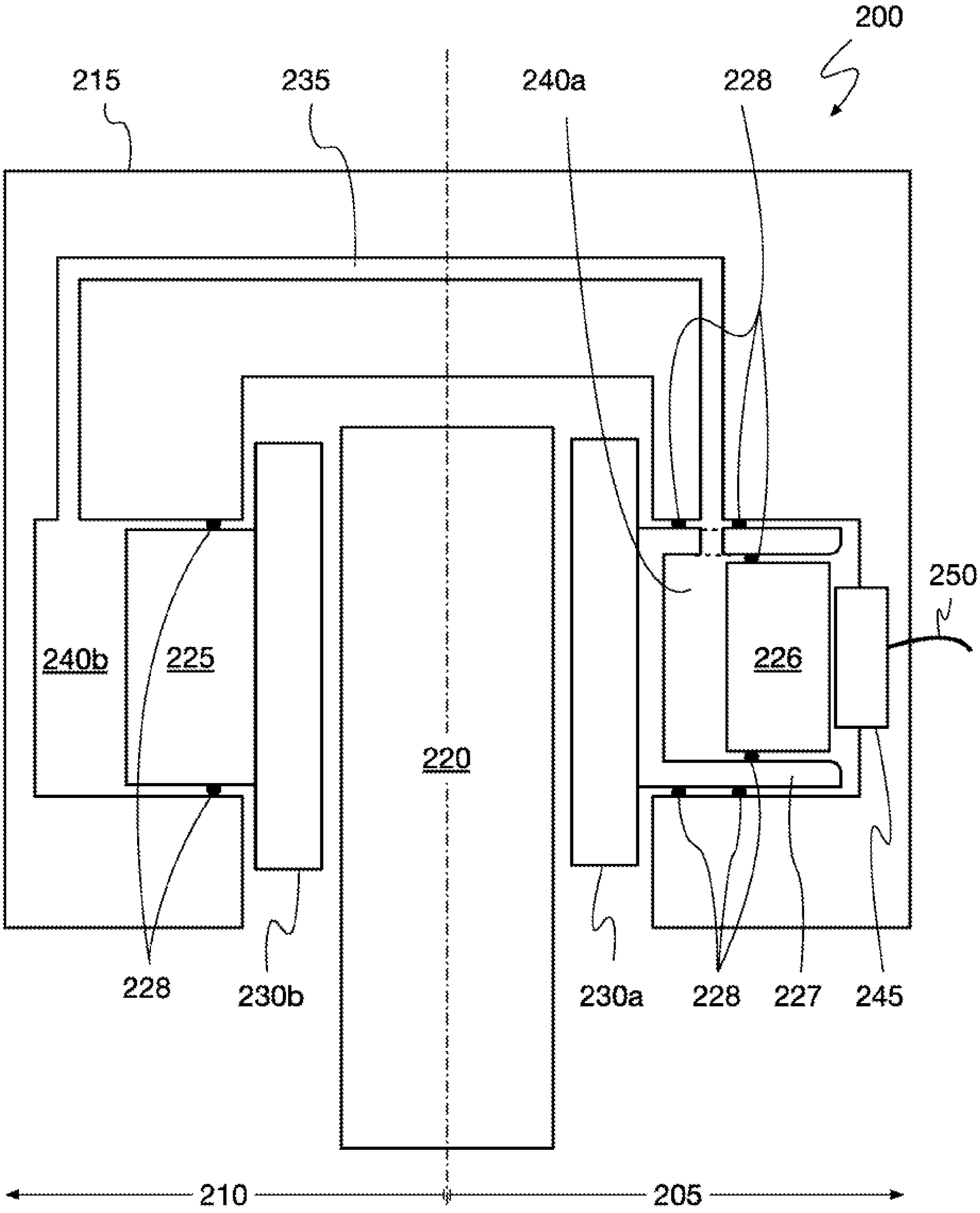
FIG. 2 schematically shows the construction of a fixed-caliper brake according to a first preferred embodiment of the invention.
Figure 3:
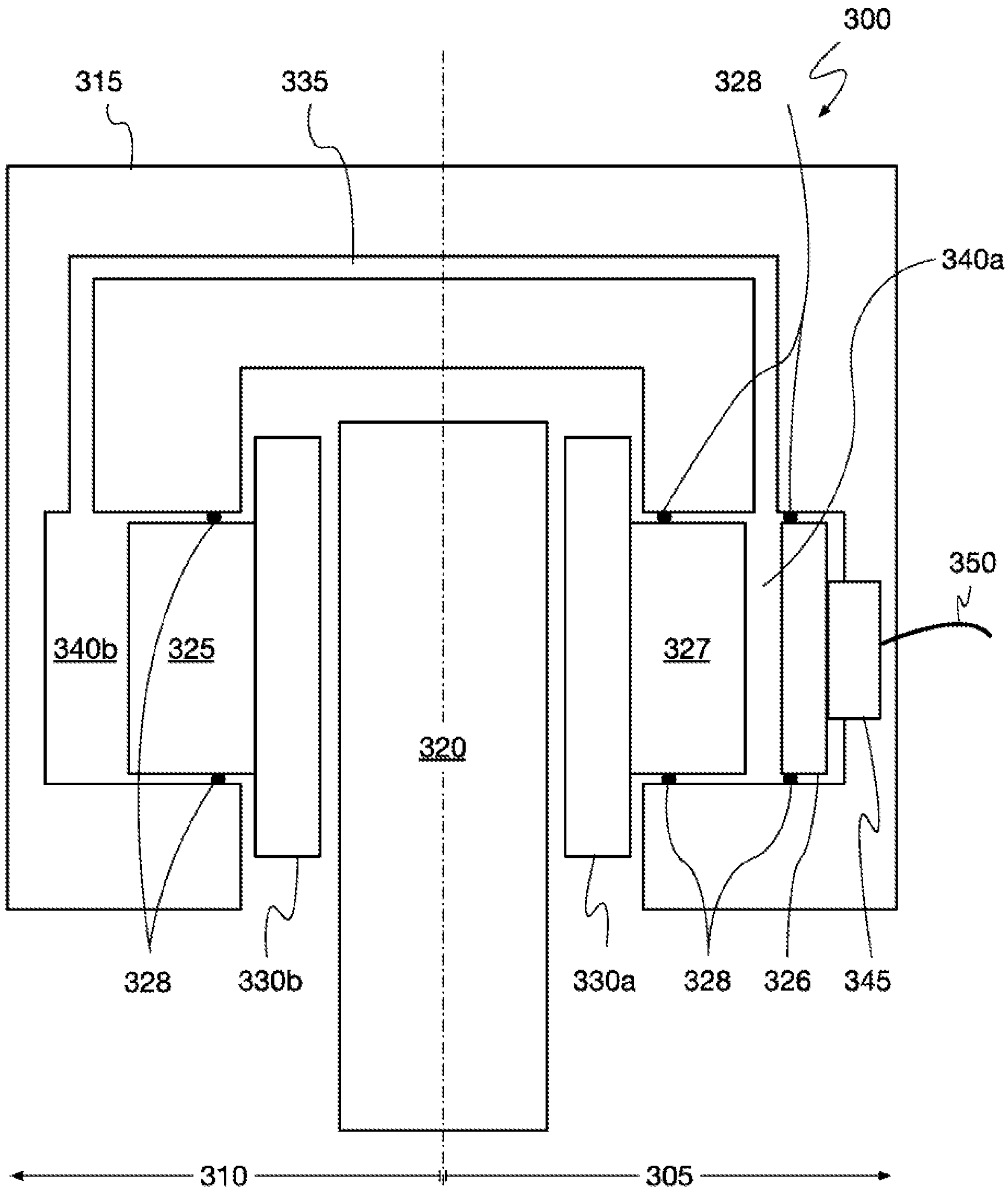
FIG. 3 schematically shows the construction of a fixed-caliper brake according to a second preferred embodiment of the invention.

The embodiments 200 and 300 of a fixed-caliper brake according to the invention that are respectively illustrated in the two following FIGS. 2 and 3 are based, by contrast, on a hybrid operating concept in which the fixed-caliper brake is not activated hydraulically but rather via a signal which may be in particular an electric, optical or wireless signal. An electromechanical actuator provided as part of the fixed-caliper brake itself serves, controlled by this signal, as an actuating element for the fixed-caliper brake.

The construction of the fixed-caliper brake is no longer substantially symmetrical, but rather asymmetrical. On the one side, preferably the inner side, of the fixed-caliper brake, the actuator acts on a first piston element, which is hydraulically coupled to a second piston element, in order to transmit the action of the actuator thereto. The second piston element in turn bears a brake pad and, when the brake is actuated, owing to the action of force of the actuator transmitted to it as described, is pressed against the brake disk in order to brake the latter. By contrast, in order to actuate the brake piston on the other side of the fixed-caliper brake, i.e. preferably the outer side, the hydraulic pressure generated on the first side is transmitted similarly as in the conventional fixed-caliper brake according to FIG. 1 via a hydraulic channel.

In this way, the second side, i.e. in particular the outer side, of the fixed-caliper brake can furthermore be driven exclusively hydraulically, with space being optimized, while the fixed-caliper brake as a whole, instead of a hydraulic activation and energy supply, obtains a signal activation and has a dedicated, hydraulically independent energy supply for actuating the actuator.

The first embodiment 200 of the fixed-caliper brake according to the invention that is illustrated in FIG. 2 has a brake caliper 215 connected fixedly to a wheel suspension of the wheel to be braked (not illustrated), a brake disk 220 and a respective brake piston device on both sides thereof, i.e. both on an inner side 205 and on an outer side 210 of the fixed-caliper brake 200, the brake piston device in the simplest case having only one brake piston and one brake pad 230*a* or 230*b* fastened thereto. However, use may equally also be made of brake piston devices which in each case themselves have a plurality of brake pistons, and also the use of a plurality of brake pads per brake piston is possible.

The brake piston of the first side 205, which preferably forms the inner side of the vehicle brake, is designed as a telescopic brake piston which in particular has a hollow piston 227 and an internal piston 226 mounted in a coaxially movable manner therein. The hollow piston 227 in turn is arranged movably in a cylindrical recess of the brake caliper 215 and is sealed therein via sealing rings 228. By contrast, on the second side 210, which preferably forms the outer side of the vehicle brake, a conventional, hydraulically actuated brake piston 225 is provided in a cylindrical recess of the brake caliper 215, the construction of which brake piston substantially corresponds to that of the brake pistons 125*a* and 125*b* from FIG. 1. A seal (not illustrated) which can be designed in particular in the form of one or more sealing rings can also be provided for the brake piston 225 in a similar manner as for the hollow piston 227.

In addition, as part of the fixed-caliper brake 200, an electromechanical actuator 245 is provided which is fixed to the brake caliper 215 and is coupled in terms of force to the rear side of the internal piston 226 in order to be able to transmit an—in particular mechanical, electrical or magnetic—action of force to the internal piston. The electromechanical actuator 245 is activatable via a signal, which may be in particular electric or optical, and also has an, in particular, electric, energy supply which can be provided in particular via an electric line 250. In the case of an electric activation, this line 250 can serve at the same time as an activation line for the actuator 245, for which purpose, for example, an alternating voltage signal superimposed on an energy supply direct voltage can be used.

In addition, a hydraulic channel 235 filled with a hydraulic fluid is provided. It connects a first fluid chamber 240*a*, which is defined inside the hollow piston 227 by the inner wall thereof and the front side of the internal piston 226, to a second fluid chamber 240*b*, which is defined on the second side of the brake 200 in the cylindrical recess for the brake piston 225 by the inner wall of this recess and the rear side of the brake piston 225, and therefore provides a hydraulic coupling of the two fluid chambers 240*a, b*. In order to produce or improve the hydraulic coupling of the hydraulic channel 235 to the first fluid chamber 240*a* located in the interior of the hollow piston 227, one or more passages for the hydraulic fluid can be provided in the wall of the hollow piston 227.

If the actuator 245 is now activated and thus actuated, it exerts a force on the internal piston 226 causing the latter to move inside the hollow piston 227 in the direction of the brake disk 220 and, in the process, to exert an increased pressure on the hydraulic fluid present in the fluid chamber 240*a*. This pressure increase firstly causes the hollow piston 227 to likewise be moved in the direction of the brake disk 220 and, in the process, to press the brake pad 230*a* onto the brake disk. Secondly, the pressure increase propagates via the hydraulic fluid located in the hydraulic channel 235 to the second fluid chamber 240*b* and leads there in the same manner, as already described above for FIG. 1, to an action of force on the rear side of the brake piston 225. This action of force causes the brake piston 225 in turn to press the brake pad 230*b* in the opposite direction to the direction of movement of the brake pad 230*a* against the brake disk 220. Overall, the brake disk 220 is thus braked on both sides by the action of force of the brake pads 230*a* and 230*b*.

The second embodiment 300 of the fixed-caliper brake according to the invention that is illustrated in FIG. 3 has a brake caliper 315 connected fixedly to a wheel suspension of the wheel to be braked (not illustrated), a brake disk 320 and a respective brake piston device on both sides thereof, i.e. both on an inner side 305 and on an outer side 310 of the fixed-caliper brake 300. In the simplest case, this brake piston device has only one brake piston and one brake pad 330*a* or 330*b* fastened thereto. However, as in the case of the brake 200, use can equally also be made of brake piston devices which themselves have a plurality of brake pistons, and also the use of a plurality of brake pads per brake piston is possible.

The brake piston of the first side 305, which preferably forms the inner side of the vehicle brake, is designed here especially as a series connection of two individual pistons 326 and 327 which are hydraulically coupled via a first fluid chamber 340*a* located in between and which are arranged movably coaxially in a cylindrical recess of the brake caliper 315 and are sealed therein via sealing rings 328. By contrast, on the second side 310, which preferably forms the outer side of the vehicle brake, a conventional, hydraulically actuated brake piston 325 is provided in a cylindrical recess of the brake caliper 215, the construction of which brake piston substantially corresponds to that of the brake piston 225 from FIG. 1. A seal (not illustrated) which can be designed in particular in the form of one or more sealing rings can also be provided for the brake piston 325, as for the brake piston 225.

In addition, as part of the fixed-caliper brake 300, an electromechanical actuator 345 is provided which is fixed to the brake caliper 315 and is coupled in terms of force to the rear side of a first piston 226 of the series-connected pistons in order to be able to transmit an—in particular mechanical, electrical or magnetic—action of force thereto. The electromechanical actuator 345 is activatable via a signal, which can be in particular electrical or optical, and also has an, in particular electrical, energy supply which can be provided, for example, via an electric line 350. In the event of an electrical activation, this line 350 can serve at the same time as an activation line for the actuator 345, for which purpose, for example, an alternating voltage signal superimposed on an energy supply direct voltage can be used.

In addition, a hydraulic channel 335 filled with a hydraulic fluid is provided. It connects the first fluid chamber 340*a* to a second fluid chamber 340*b*, which is defined on the second side of the brake 300 in the cylindrical recess for the brake piston 325 by the inner wall of the recess and the rear side of the brake piston 325, and therefore provides a hydraulic coupling of the two fluid chambers 340*a, b*.

If the actuator 345 is now activated and therefore actuated, it exerts a force on the first piston 326 causing the latter to move inside the cylinder in the direction of the brake disk 320 and, in the process, to exert an increased pressure on the hydraulic fluid present in the fluid chamber 340*a*. This pressure increase firstly causes the second piston 327 to likewise move in the direction of the brake disk 320 and, in the process, to press the brake pad 330*a* against the latter. Secondly, the pressure increase propagates via the hydraulic fluid located in the hydraulic channel 335 to the second fluid chamber 340*b* and leads there in the same manner, as already described above for FIGS. 1 and 2, to an action of force on the rear side of the brake piston 325. This action of force causes the brake piston 325 in turn to press the brake pad 330*b* in the opposite direction to the direction of movement of the brake pad 330*a* against the brake disk 320. Overall, the brake disk 320 is thus braked on both sides by the action of force of the brake pads 330*a* and 330*b*.

Figure 4:
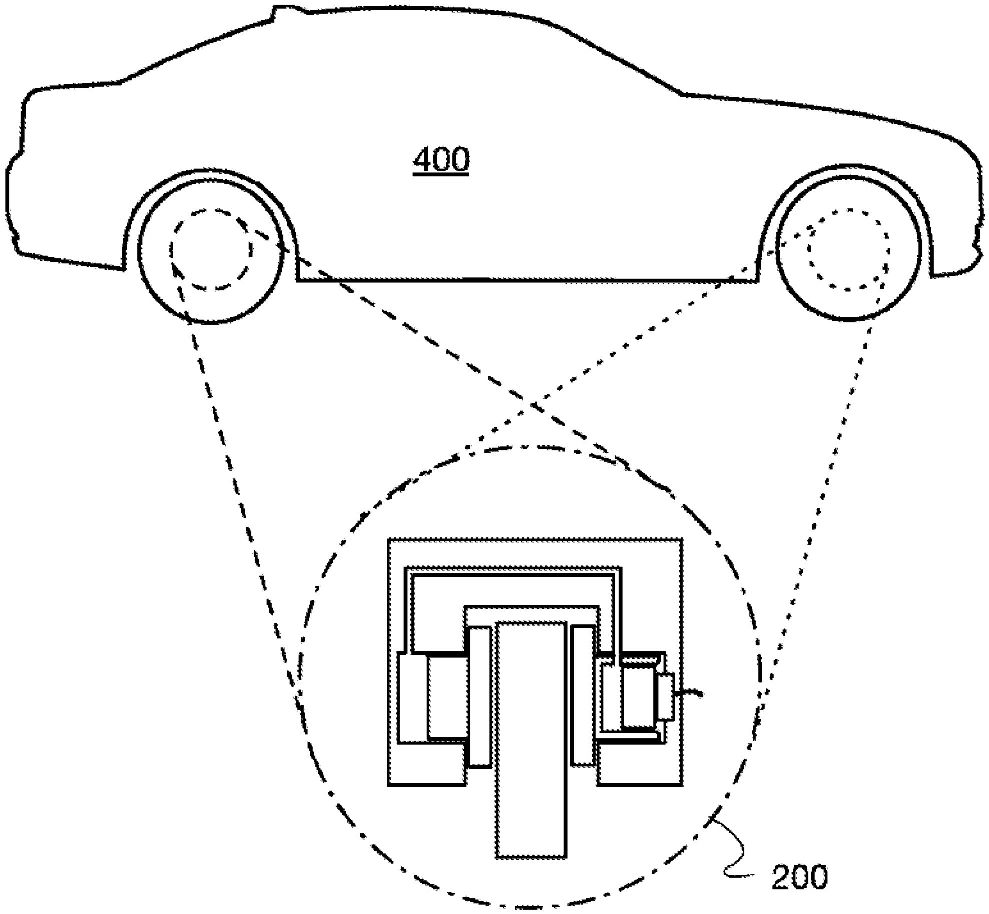
FIG. 4 schematically shows a motor vehicle, the chassis of which is equipped with fixed-caliper brakes according to FIG. 2 (or alternatively according to FIG. 3).

As illustrated in FIG. 4, the fixed-caliper brakes according to the invention, in particular according to the embodiments illustrated in FIG. 2 or FIG. 3, can be provided, for example, as vehicle brakes for a motor vehicle on wheel suspensions thereof, in order to brake the wheels of the vehicle. It is in particular also conceivable for different types of brake to be used, for example the brakes from FIG. 2 for the front wheels and the brakes from FIG. 3 for the rear wheels.

While at least one exemplary embodiment has been described previously, it should be noted that a large number of variations thereof exist. It should also be remembered that the exemplary embodiments described are only none-limiting examples, and the intention is not to thereby restrict the scope, applicability or configuration of the devices and methods described here. On the contrary, the preceding description will provide a person skilled in the art with guidance to implement at least one exemplary embodiment, and it goes without saying that various changes to the manner of operation and the arrangement of the elements described in an exemplary embodiment can be made without thereby departing from the subject matter respectively defined in the accompanying claims and from legal equivalents of the subject matter.

LIST OF REFERENCE SIGNS

100 Conventional hydraulic fixed-caliper brake
105 First side of the fixed-caliper brake 100, on the inner side of the vehicle
110 Second side of the fixed-caliper brake 100, on the outer side of the vehicle
115 Brake caliper
120 Brake disk
125*a,b*, Brake pistons
128 Seals, in particular sealing rings
130*a,b* Brake pads
135 Hydraulic channel
140*a,b* Fluid chambers
200 Fixed-caliper brake according to a first embodiment
205 First side of the fixed-caliper brake 200, on the inner side of the vehicle
210 Second side of the fixed-caliper brake 200, on the outer side of the vehicle
215 Brake caliper
220 Brake disk
225 Brake piston
226 Internal piston
227 Hollow piston
228 Seals, in particular sealing rings
230*a,b* Brake pads
235 Hydraulic channel
240*a,b* Fluid chambers
245 Electromechanical actuator
250 Electric line for energy supply/activation of the actuator 245
300 Fixed-caliper brake according to a second embodiment
305 First side of the fixed-caliper brake 300, on the inner side of the vehicle
310 Second side of the fixed-caliper brake 300, on the outer side of the vehicle
315 Brake caliper
320 Brake disk
325 Brake piston
326 First piston
327 Second piston
328 Seals, in particular sealing rings
330*a,b* Brake pads
335 Hydraulic channel
340*a,b* Fluid chambers
345 Electromechanical actuator
350 Electric line for energy supply/activation of the actuator 345
400 Vehicle, here by way of example a motor vehicle

What is claimed is:

1. A fixed-caliper brake, comprising:
a brake caliper;
a brake disk;
a first brake piston device which is arranged on or in the brake caliper and is configured to transmit a first pressure force to an associated first side surface of the brake disk;
a second brake piston device which is arranged on or in the brake caliper and is configured to transmit a second pressure force to an associated second side surface of the brake disk opposite the first side surface; and
an electromechanical actuator which is arranged on or in the brake caliper and is configured, when actuated, to exert, both on the first brake piston device and on the second brake piston device, a respective force which is further transmitted by the respective brake piston device, at least proportionally, as a respective first or second pressure force to the respectively associated side surface of the brake disk; wherein
the electromechanical actuator and the second brake piston device are hydraulically coupled to each other in order to bring about the exertion of force from the electromechanical actuator to the second brake piston device,
the exertion of force on the first brake piston device takes place directly by the electromechanical actuator itself,
the first brake piston device has two pistons which are hydraulically coupled to each other in terms of force by way of a fluid located between them,
the first brake piston device has a telescopic brake piston which has a hollow piston which is arranged movably relative to the brake disk and has an internal piston arranged therein so as to be movable relative to the hollow piston,
the interior of the hollow piston together with a head surface of the internal piston defines a fluid chamber, which is hydraulically coupled to the second brake piston device, inside the hollow piston, and
the telescopic brake piston is coupled in terms of force to the electromechanical actuator in such a manner that, when the electromechanical actuator is actuated, a fluid located in the fluid chamber is pressurized via the internal piston, the pressurization firstly bringing about the first pressure force on the brake disk via the hollow piston and secondly bringing about the second pressure force on the brake disk via the hydraulically coupled second brake piston device.

2. The fixed-caliper brake according to claim 1, wherein the electromechanical actuator is arranged relative to the brake disk on the same side of the fixed-caliper brake as the first brake piston device.

3. The fixed-caliper brake according to claim 1, wherein a hydraulic channel running at least in sections inside the brake caliper is provided for the hydraulic coupling of the electromechanical actuator to the second brake piston device.

4. The fixed-caliper brake according to claim 1, wherein the first brake piston device is also hydraulically coupled to the electromechanical actuator for bringing about the exertion of force from the electromechanical actuator to the first brake piston device.

5. The fixed-caliper brake according to claim 4, wherein the electromechanical actuator and the two brake piston devices are hydraulically coupled to a common hydraulic channel in order to bring about the exertion of force from the electromechanical actuator on the brake piston devices.

6. The fixed-caliper brake according to claim 4, wherein the first brake piston device is coupled in terms of force mechanically or electromechanically to the actuator in order to bring about exertion of force from the actuator on the first brake piston device, in such a manner that, during the exertion of force, at the same time the exertion of force from the actuator on the second brake piston device is brought about via the hydraulic coupling thereof to the actuator.

7. The fixed-caliper brake according to claim 1, wherein the first brake piston device is coupled in terms of force mechanically or electromechanically to the electromechanical actuator, in order to bring about the exertion of force from the electromechanical actuator on the first brake piston device, in such a manner that, during said exertion of force, at the same time the exertion of force from the electromechanical actuator on the second brake piston device is brought about via the hydraulic coupling thereof to the electromechanical actuator.

8. The fixed-caliper brake according to claim 7, wherein the electromechanical actuator is configured to generate force by way of a spindle drive or a piezo element.

9. The fixed-caliper brake according to claim 1, wherein:

the two pistons are connected in series;

an intermediate space between the two pistons defines a fluid chamber, which is hydraulically coupled to the second brake piston device, inside the first brake piston device for the fluid; and a first of the two pistons is coupled in terms of force to the electromechanical actuator in such a manner that, when the electromechanical actuator is actuated, the fluid located in the fluid chamber is pressurized via this first piston, the pressurization firstly bringing about the first pressure force on the brake disk via the second of the pistons and secondly bringing about the second pressure force on the brake disk via the hydraulically coupled second brake piston device.

10. The fixed-caliper brake according to claim 1, wherein the electromechanical actuator is connected to an electric line which serves both for energy supply of the electromechanical actuator and activation thereof.

11. A vehicle comprising a fixed-caliper brake according to claim 1.

12. The fixed-caliper brake according to claim 1, wherein the first brake piston device is disposed inside of a separate and hollow piston.

* * * * *